US010011262B2

(12) United States Patent
Birch et al.

(10) Patent No.: US 10,011,262 B2
(45) Date of Patent: Jul. 3, 2018

(54) POWERTRAIN CONTROL SYSTEM AND METHOD

(71) Applicant: Jaguar Land Rover Limited, Whitley (GB)

(72) Inventors: John Birch, Coventry (GB); Paul Darnell, Coventry (GB); William Rudman, Coventry (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 16 days.

(21) Appl. No.: 14/406,040

(22) PCT Filed: Jun. 7, 2013

(86) PCT No.: PCT/EP2013/061857
§ 371 (c)(1),
(2) Date: Dec. 5, 2014

(87) PCT Pub. No.: WO2013/182704
PCT Pub. Date: Dec. 12, 2013

(65) Prior Publication Data
US 2015/0151737 A1    Jun. 4, 2015

(30) Foreign Application Priority Data

Jun. 7, 2012    (GB) .................................. 1210059.0

(51) Int. Cl.
*B60W 20/15* (2016.01)
*B60W 20/00* (2016.01)
(Continued)

(52) U.S. Cl.
CPC .......... *B60W 20/108* (2013.01); *B60W 10/06* (2013.01); *B60W 10/08* (2013.01);
(Continued)

(58) Field of Classification Search
CPC .. B60W 20/108; B60W 20/15; B60W 50/087; B60W 30/18172; B60W 10/06;
(Continued)

(56) References Cited

U.S. PATENT DOCUMENTS 6,687,593 B1 * 2/2004 Crombez ................. B60T 1/10
180/170
7,091,678 B2 * 8/2006 Hommi .................. B60K 6/445
318/373

(Continued)

FOREIGN PATENT DOCUMENTS

EP    2 460 703 A1    6/2012
GB    2 457 162 A    8/2009
(Continued)

OTHER PUBLICATIONS

Lazarte, Maria, "High-tech vehicles—High-tech ISO safety standards", Jan. 10, 2012, <http://www.iso.org/iso/home/newsindex/news archive/news.htm?refid=Ref1499>, accessed May 15, 2016.*
(Continued)

*Primary Examiner* — Genna M Mott
(74) *Attorney, Agent, or Firm* — Myers Bigel, P.A.

(57) ABSTRACT

The present invention relates to a powertrain control system (1) for a vehicle. The powertrain control system (1) includes a torque limit calculator (47) for generating a torque control signal based (57) on one or more vehicle operating parameters. A torque request module (43) is provided for generating a torque request signal (45) and a torque control module (7) controls the torque applied by the powertrain. The torque control module (7) is configured to receive the torque request signal (45) from the torque request module (43) and the torque control signal (57) from the torque limit calculator (47) and to control the torque applied by the powertrain in dependence on the torque request signal (45) and the torque control signal (57). The present invention also
(Continued)

relates to a control system; and a method of operating a powertrain control system.

17 Claims, 2 Drawing Sheets

(51) Int. Cl.
| | |
|---|---|
| *B60W 10/06* | (2006.01) |
| *B60W 10/08* | (2006.01) |
| *B60W 30/02* | (2012.01) |
| *B60W 30/18* | (2012.01) |
| *B60W 50/08* | (2012.01) |
| *B60K 28/16* | (2006.01) |
| *B60W 50/00* | (2006.01) |

(52) U.S. Cl.
CPC .......... *B60W 20/15* (2016.01); *B60W 30/02* (2013.01); *B60W 30/18172* (2013.01); *B60W 50/087* (2013.01); *B60K 28/16* (2013.01); *B60W 20/00* (2013.01); *B60W 2050/0006* (2013.01); *B60W 2050/0012* (2013.01); *B60W 2510/083* (2013.01); *B60W 2510/084* (2013.01); *B60W 2520/26* (2013.01); *B60W 2540/10* (2013.01); *Y02T 10/6286* (2013.01); *Y02T 10/7258* (2013.01); *Y10S 903/93* (2013.01)

(58) Field of Classification Search
CPC .............. B60W 30/02; B60W 10/08; B60W 2510/083; B60W 2540/10; B60W 2050/0012; B60W 20/00; B60W 2050/0006; B60W 2510/084; B60W 2520/26; Y02T 10/7258; Y02T 10/6286; Y10S 903/93; B60K 28/16
See application file for complete search history.

(56) References Cited

U.S. PATENT DOCUMENTS

| | | | |
|---|---|---|---|
| 7,281,770 B1 | 10/2007 | Curran et al. | |
| 2004/0259684 A1* | 12/2004 | Kresse | B60W 10/06 477/115 |
| 2007/0007058 A1* | 1/2007 | Uenodai | B60K 28/16 180/65.28 |
| 2009/0024263 A1 | 1/2009 | Simon, Jr. | |
| 2009/0115246 A1* | 5/2009 | Yanagida | B60K 28/16 303/144 |
| 2009/0118880 A1 | 5/2009 | Heap et al. | |
| 2009/0125171 A1 | 5/2009 | West et al. | |
| 2009/0182478 A1 | 7/2009 | Whitney et al. | |
| 2011/0148184 A1* | 6/2011 | Suzuki | B60L 3/108 303/3 |
| 2012/0046812 A1 | 2/2012 | Sujan et al. | |
| 2012/0136540 A1 | 5/2012 | Miller | |
| 2013/0096797 A1* | 4/2013 | Whitney | B60K 6/445 701/87 |

FOREIGN PATENT DOCUMENTS

| | | |
|---|---|---|
| JP | 2004-254375 | 9/2004 |
| JP | 2006-081266 | 3/2006 |
| JP | 2007-118780 | 5/2007 |
| JP | 2011-097826 | 5/2011 |
| JP | 2012-060753 | 3/2012 |

OTHER PUBLICATIONS

Office Action Summary, Japanese Patent Application No. 2015-515544, dated Nov. 17, 2015, 7 pages.
International Search Report, PCT/EP2013/061857, dated Dec. 9, 2013, 5 pages.
Combined Search and Examination Report, Application No. GB1310192.8, dated Dec. 9, 2013, 8 pages.
Combined Search and Examination Report, Application No. GB1210059.0, dated Sep. 20, 2012, 8 pages.
Combined Search and Examination Report, Application No. GB1411042.3, dated Oct. 27, 2014, 4 pages.

* cited by examiner

POWERTRAIN CONTROL SYSTEM AND METHOD

RELATED APPLICATIONS

This application is a 35 U.S.C. § 371 national stage application of PCT Application No. PCT/EP2013/061857, filed on Jun. 7, 2013, which claims priority from Great Britain Patent Application No. 1210059.0, filed on Jun. 7, 2012, the contents of which are incorporated herein by reference in their entireties. The above-referenced PCT International Application was published in the English language as International Publication No. WO 2013/182704 A2 on Dec. 12, 2013.

TECHNICAL FIELD

The present invention relates to a powertrain control system and method. The powertrain control system can, for example, be implemented in a motor vehicle. Aspects of the present invention relate to a control system and a method of operating a powertrain.

BACKGROUND OF THE INVENTION

The unintentional application of torque (either positive or negative, i.e. torque leading to acceleration or deceleration of the vehicle) could potentially affect the stability of a motor vehicle. This is particularly relevant for vehicles incorporating electric drive motors (or electric machines) which can implement a higher rate of change in the applied torque than internal combustion engines (for example, due to the speed of application of the electric field and lower rotational inertia). Accordingly, the control of an electric drive motor, when applying both positive (drive) torque and negative (braking) torque, is of the utmost importance.

The present invention sets out to provide an improved powertrain control system and methods of controlling a powertrain system.

SUMMARY OF THE INVENTION

Aspects of the present invention relate to a powertrain control system; a control system and a method of controlling a powertrain.

In a further aspect, the present invention relates to a powertrain control system for a vehicle, the powertrain control system comprising:

a torque limit calculator means for generating a torque control signal based on one or more vehicle operating parameters;

a torque request module for generating a torque request signal; and a torque control module for controlling the torque applied by the powertrain, the torque control module being configured to receive the torque request signal from the torque request module and the torque control signal from the torque limit calculator means and to control the torque applied by the powertrain in dependence on the torque request signal and the torque control signal. The torque control module can perform an additional check based on the torque control signal before implementing a change in the torque applied by the powertrain. For example, the torque control module can check the validity of the torque request signal based on the torque control signal. The torque control signal is used as a "feed-forward" signal for the torque control module. The torque control module can be configured to inhibit or prevent the application of torque which would affect vehicle stability, for example determined by comparison with one or more threshold values.

By configuring the torque control module to receive the torque request signal from the torque request module and the torque control signal from the torque limit calculator means, the integrity rating of the powertrain control system can potentially be improved. If the torque control module has a higher integrity rating than the torque request module, at least in certain embodiments the powertrain control system as a whole can comply with the higher integrity rating of the torque control module. In particular, the level of safety of the powertrain control system improved can be improved by virtue of the of the torque control signal being provided to the torque control module from an independent controller (i.e. the torque limit calculator means) which is separate from the torque request module. In this way, a malfunction of the torque request module which may, inadvertently, result in the issuance of a torque request signal which, if acted upon, would compromise the stability of the vehicle, can be mitigated. This is because the torque control module separately receives the torque control signal from the torque limit calculator and this can be used to validate or override the torque request signal accordingly.

The torque limit calculator means may be provided in a further module. The torque request module may receive the torque control signal from the torque limit calculator means, the torque request module being configured to adjust the torque request signal in dependence on the torque control signal.

The torque control signal can be configured to inhibit or to restrict the applied torque. The torque control signal can control the maximum torque applied (either positive or negative). Alternatively, the torque control signal can be configured to control a rate of change (either positive or negative) in the applied torque. For example, the torque control signal can limit the rate of change of an increase or decrease in the applied torque. The torque control signal could be configured to both limit the applied torque and limit the rate of change in the applied torque. The torque control module can be operable to control the applied torque based on said torque control signal.

The torque limit calculator can be provided in an anti-lock brake system (ABS) module. The torque limit calculator can utilise one or more of the following operating parameters: wheel speed, lateral acceleration, steering angle and yaw. The torque limit calculator can be coupled to appropriate sensors for determining said operating parameters.

The torque request module can be configured to generate the torque request signal based on a driver torque demand signal and/or a cruise control torque demand signal.

The torque control module can be configured to control at least one electric drive motor and/or an internal combustion engine. The torque control module can be an inverter for controlling operating of an electric drive motor. The torque control module can be configured to control the application of positive and/or negative torque by at least one electric drive motor. Alternatively, or in addition, the torque control module can be configured to control the application of positive torque by an internal combustion engine.

The torque control module can have a higher integrity rating (e.g. and Automotive Safety Integrity Level (ASIL)) than the torque request module. For example, the torque request module can be ASIL B compliant and the torque control module can be ASIL C compliant. The torque limit calculator should have an integrity rating which is no lower than that of the torque control module. For example, the torque limit calculator can also be ASIL C compliant. In this way the power control system as a whole can be ASIL C compliant even though the torque request module need only be ASIL B compliant. This is because the torque control module receives the torque control signal from the torque limit calculator, independently of the torque request signal received from the torque request module.

In a further aspect, the present invention relates to a control system comprising:
  first and second modules configured to output respective first and second signals to a controller;
  wherein the first module, the second module and the controller each have respective integrity ratings, the controller having a higher integrity rating than the second control module.

The first module can be configured to output the first signal to both the second module and the controller. The second module can use the first signal to generate the second signal. Accordingly, the second signal can be based at least partially on the first signal. The first module can have an integrity rating which is the same as or higher than that of the controller.

The first module can be a torque limit calculator for generating a torque control signal based on one or more vehicle operating parameters. The second module can be a torque request module for generating a torque request signal. The controller can be a torque control module for controlling operation of at least one electric drive motor. The controller can be an inverter, for example.

In a further aspect, the present invention relates to a method of operating a powertrain system comprising a powertrain and a controller, the method comprising:
  generating a torque control signal based on one or more vehicle operating parameters and outputting the torque control signal to the controller;
  generating a torque request signal and outputting the torque request signal to the controller; and
  operating the controller to control the torque applied by the powertrain based on the torque control signal and the torque request signal.

The method can enable a controller having a higher integrity rating to be used to control the torque applied by the powertrain. The method can be implemented in a system in which the controller has a higher integrity rating than the processor(s) for generating the torque request signal.

The torque control signal can define a limit to the applied torque (i.e. a maximum applied torque). Alternatively, or in addition, the torque control signal can define a limit to a rate of change of the applied torque. The controller can be configured to control operation of at least one electric drive motor. The controller can be an inverter. The torque request signal can be based on a driver torque demand signal and/or a cruise control torque demand signal.

The method(s) described herein can be machine-implemented. The method(s) can be implemented on a computational device comprising one or more processors, such as an electronic microprocessor. The processor(s) can be configured to perform computational instructions stored in memory or in a storage device. The device described herein can comprise one or more processors configured to perform computational instructions.

In a further aspect the present invention relates to a computer system comprising: programmable circuitry; and software encoded on at least one computer-readable medium to program the programmable circuitry to implement the method described herein.

According to a still further aspect the present invention relates to one or more computer-readable media having computer-readable instructions thereon which, when executed by a computer, cause the computer to perform all the steps of the method(s) described herein. In a still further aspect, the present invention relates to a powertrain control system for a vehicle, the powertrain control system comprising:
  a torque limit calculator means for generating a torque control signal based on one or more vehicle operating parameters;
  a torque request module for generating a torque request signal; and a torque control module for controlling the torque applied by the powertrain, the torque control module being configured to receive the torque request signal from the torque request module and the torque control signal from the torque limit calculator.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

Embodiments of the present invention will now be described, by way of example only, with reference to the accompanying drawings, in which.

DETAILED DESCRIPTION

Figure 1:
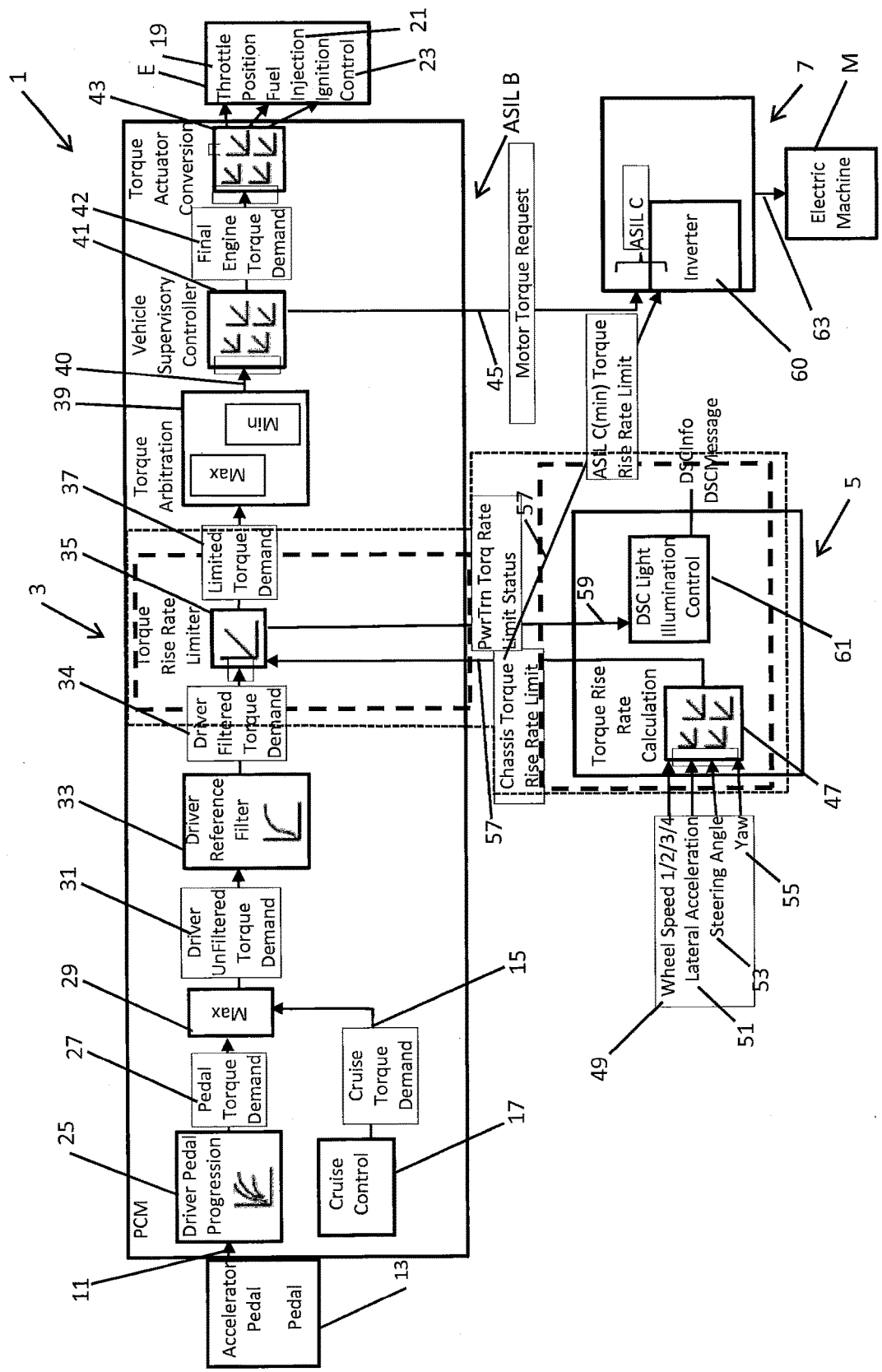
FIG. 1 shows a schematic overview of a powertrain control system in accordance with an embodiment of the present invention.

A powertrain control system 1 in accordance with an embodiment of the present invention is illustrated in FIG. 1. The powertrain control system 1 is configured to control an internal combustion engine E and an electric drive motor M of a hybrid motor vehicle (not shown) having four driven wheels (not shown). The present invention could also be used for vehicles having two driven wheels.

The powertrain control system 1 comprises a powertrain control module (PCM) 3, an anti-lock brake system (ABS) module 5 and an inverter 7. The powertrain control module 3 outputs engine control signals to the internal combustion engine E. The powertrain control module 3 also outputs motor control signals to the inverter 7 to control the electric drive motor M.

In the present embodiment, the electric drive motor M is coupled to a transmission of the vehicle, but other configurations can be implemented, for example providing an electric drive motor in a hub of a driven wheel of the vehicle. The electric drive motor M can be selectively operated in a drive mode to apply a positive torque to the vehicle drivetrain for propelling the vehicle; and in a regenerative mode to apply a negative (braking) torque to the vehicle drivetrain for braking the vehicle. The electric drive motor can apply torque (both positive and negative) at a high rate of change and this can potentially affect vehicle stability.

The powertrain control module 3 comprises a processor for generating the engine and motor control signals in response to either a driver torque demand signal 11 (generated in response to actuation of an accelerator pedal 13 by a driver of the vehicle) or a cruise control torque demand signal 15 (generated by a cruise control module 17). It will be appreciated that other motor control signals could be received, for example a power demand request etc. The engine control signals output by the processor consist of a throttle position signal 19, a fuel injection signal 21 and an ignition control signal 23. It will be appreciated that other engine control signals could be output by the processor, for example to control valve lift. The steps performed by the processor to generate the engine control signals will now be described with reference to FIG. 1.

A driver pedal progression map 25 is applied to the driver torque demand signal 11 to generate a pedal torque demand signal 27. A comparator 29 compares the pedal torque demand signal 27 and the cruise control torque demand signal 15 and generates an unfiltered torque demand signal 31 based on the signal representing a higher torque demand. A driver reference filter 33 is applied to the unfiltered torque demand signal 31 to generate a filtered torque demand signal 34 which is output to a first torque rise rate limiter module 35. As described in more detail herein, the first torque rise rate limiter module 35 communicates with the anti-lock brake system (ABS) module 5 and outputs a limited torque demand signal 37.

A torque arbitration module 39 determines maximum and minimum torque levels and outputs a reference signal 40 to a vehicle supervisory control (VSC) module 41. The VSC module 41 determines the torque distribution between the engine E and the electric drive motor M. The VSC module 41 outputs a final engine torque demand signal 42 to a torque/actuator conversion module 43. The torque/actuator conversion module 43 converts the final engine torque demand signal 42 into the throttle position signal 19, the fuel injection signal 21 and the ignition control signal 23 for controlling the engine E. The VSC module 41 also outputs a motor torque request signal 45 to the inverter 7 for controlling the electric drive motor M.

The ABS module 5 is coupled to a plurality of sensors for measuring vehicle operating parameters associated with motion of the vehicle across a surface. The sensors each output measurement signals to a torque rise rate calculation module 47 provided in the ABS module 5. The sensors can, for example, include four wheel speed sensors 49 (one for each wheel), a lateral acceleration sensor 51, a steering angle sensor 53 and a yaw sensor 55.

The torque rise rate calculation module 47 monitors the signals from the speed sensors 49, the lateral acceleration sensor 51, the steering angle sensor 53 and the yaw sensor 55 to determine whether wheel slip is likely to occur at one or more driven wheels of the vehicle. The torque rise rate calculation module 47 could optionally also receive parameters such as vehicle weight shift (for example due to steep inclines); heavy vehicle loads; and ambient conditions (such as temperature and/or the likelihood of ice being present).

The torque rise rate calculation module 47 stores predetermined threshold values associated with each of these operating parameters, which thresholds represent the minimum acceptable level before which wheel slip may occur. A chassis torque rate control signal 57 is output to the first torque rise rate limiter module 35 to control the torque applied to the vehicle wheels via the engine and driveline (not shown) when the measured parameter(s) exceed one or more of the respective threshold values. The torque rise rate calculation module 47 can monitor the operating parameters in isolation or in pre-determined combinations. For example, the torque rise rate calculation module 47 can operate to control the torque applied when any one of the operating parameters exceeds a maximum threshold; and/or when a combination of two or more parameters exceed a lower threshold (such as medium steering angle, medium yaw and high speed).

The rate of increase in positive or negative powertrain torque (referred to herein as the torque rise rate) can be limited so as to prevent wheel slip. This can be achieved by throttling the input to the engine; and/or controlling operation of the electric drive motor. When actuated, the torque rise rate limiter module 35 can return a torque rate limit status signal 59 to a dynamic stability control (DSC) module 61 in the ABS module 5 to provide a driver notification, such as illuminating a lamp or displaying a message on an instrument cluster.

The chassis torque rate control signal 57 is also output directly from the ABS module 5 to the inverter 7. The inverter 7 comprises a second torque rise rate limiter module 60 which uses the chassis torque rise rate control signal 57 to test the validity of the motor torque request signal 45. The motor torque request signal 45 is considered to be invalid if meeting the torque request (i.e. applying torque equivalent to the torque request) would affect the stability of the vehicle based on the chassis torque rise rate control signal 57. In the event that the second torque rise rate limiter module 60 determines that the torque request signal 45 is not valid, the inverter 7 can control or inhibit an increase in the torque applied by the electric drive motor. The inverter 7 can thereby over-ride the torque request signal 45. This control arrangement is particularly advantageous as the integrity rating of the control system 1 can be improved by using an inverter 7 having a higher integrity rating than the powertrain control module 3.

The integrity rating of the control system 1 and the control modules 3, 5, 7 can, for example, be defined using the Automotive Safety Integrity Levels (ASIL) standard defined by ISO 26262. The ABS module 5 and the inverter 7 in the present embodiment both have the ability to meet integrity requirements with an ASIL rating of "C" and the powertrain control module 3 has the ability to meet integrity requirements with an ASIL rating of "B". The powertrain control system 1 according to the present invention can meet the safety requirements with an ASIL rating of "C" relating to the mitigation of an unintended torque request from the powertrain control module 3 having a high rise rate. At least in certain embodiments, this can be achieved when the powertrain control module 3 can only meet ASIL "B" integrity requirements.

In use, the ABS module 5 receives data signals from the speed sensors 49, the lateral acceleration sensor 51, the steering angle sensor 53 and the yaw sensor 55. The torque rise rate calculation module 47 compares these data signals with respective threshold values to determine what level of torque rise rate transferred to the driven wheels could destabilise the vehicle. The torque rise rate calculation module 47 outputs a chassis torque rise rate control signal 57 to the first torque rise rate limiter module 35. The torque rise rate control signal 57 varies according to the road/cornering conditions. The limited torque demand signal 37 and, consequently, the final engine torque demand signal 42 and the motor torque request signal 45 are modified in response to the chassis torque rise rate control signal 57. The torque/actuator conversion module 43 controls operation of the internal combustion engine E based on the final engine torque demand signal 42. The inverter 7 controls operation of the electric drive motor M based on the motor toque request signal 45. The VSC module 41 can control the application of torque by the internal combustion engine and/or the electric drive motor. For example, the VSC module 41 can defer application of a change in torque; modify the rate of change of an applied torque; or modify the magnitude of the torque applied.

The chassis torque rate control signal 57 is sent from the ABS module 5 directly to second torque rise rate limiter 60 provided in the inverter 7. The second torque rise rate limiter 60 uses the chassis torque rise rate control signal 57 to check the validity of the torque request signal 45 to identify a potential malfunction in the powertrain control module 3. If the second torque rise rate limiter 60 determines that the torque request signal 45 is not valid in view of the chassis torque rise rate control signal 57 (i.e. meeting the torque request would affect the vehicle stability), the inverter 7 can control or inhibit the application of torque by the electric drive motor and optionally also the internal combustion engine. The inverter 7 could be configured to receive other control signals, such as the driver torque demand signal 11.

In a further refinement, the vehicle may also be provided with a longitudinal acceleration sensor which can provide additional information about road pitch to the controller and provides another source of measurement of vehicle acceleration and speed. A vehicle roll rate sensor may also be provided. Outputs from the longitudinal acceleration sensor and/or the roll rate sensor can be provided to the torque rise rate calculation module 47 and may be used to initiate the step of limiting the rate of powertrain torque increase in a similar manner as described above.

Figure 2:
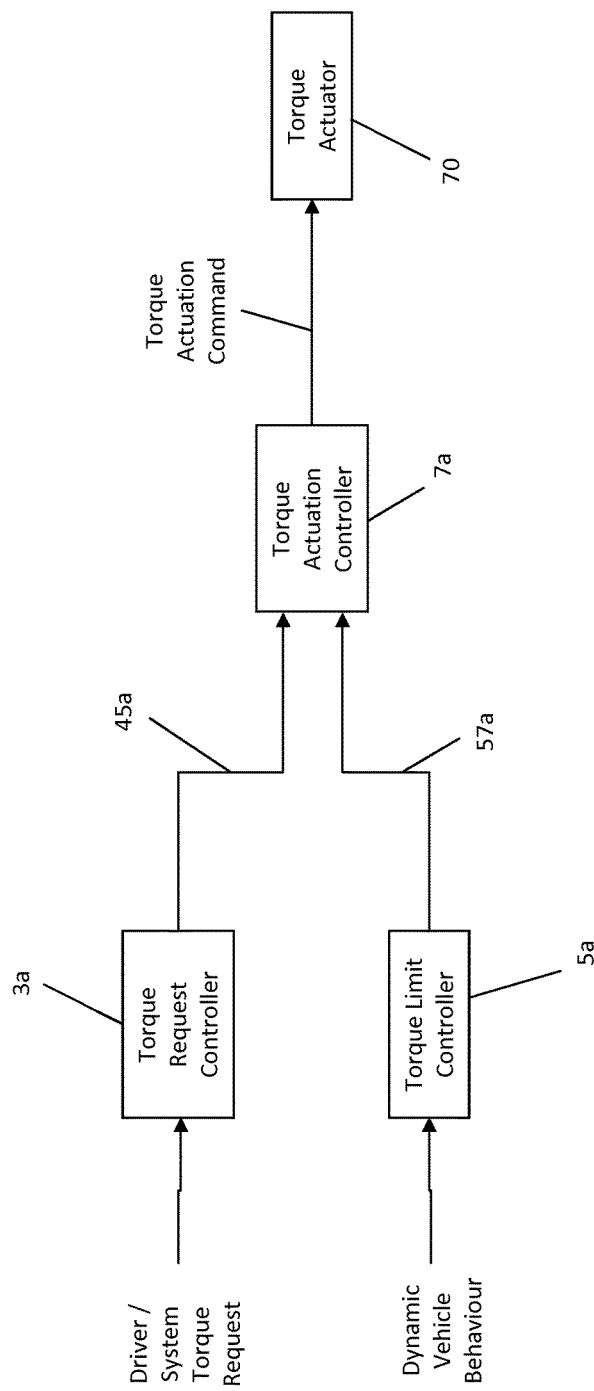
FIG. 2 an alternative schematic overview of the powertrain control system shown in FIG. 1.

FIG. 2, shows an alternative embodiment of a powertrain control system. The system comprises a torque request controller 3a, a torque limit controller 5a, a torque actuation controller 7a and a torque actuator 70. The torque request controller 3a of FIG. 2 is functionally similar to the powertrain control module 3 of FIG. 1 in that it is operable to generate a torque request signal 45a in response to a driver torque request, e.g. an accelerator pedal position, or a system torque request, such a request generated by a cruise control module. The torque request signal 45a is output to a torque actuation controller 7a, which is operable to command the delivery of torque from a torque actuator in response to the torque request signal 45a. A torque limit controller 5a is functionally similar to the torque limit calculator 5 of FIG. 1 in that it is operable to generate a torque limit signal 57a in dependence on dynamic vehicle behaviour. In particular, the dynamic vehicle behaviour may be determined based on one or more of the outputs of a yaw sensor, a steering wheel angle sensor, a wheel speed sensor and a lateral accelerometer. By comparing one of more of the sensed parameters to corresponding threshold values, the torque limit controller is operable to generate a torque limit signal 57 which is indicative of the limit of adhesion of the vehicle to the surface over which it is travelling at any one time. The torque actuation controller 7a, which may for example be an inverter of an electric or hybrid vehicle, receives the torque limit signal 57a and is operable to validate the torque request signal 45a in dependence on the torque limit signal 57a. If validated, the torque actuation controller 7a can command the requested amount of torque to be delivered by the torque actuator 70, which may be an electric motor. Alternatively, if the torque actuation controller determines, based on the torque limit signal, that the requested torque would destabilize the vehicle, then the torque actuation controller is operable to limit the torque commanded from the torque actuator in accordance with the torque limit signal. In this way, the vehicle is prevented from exceeding the limit of adhesion with the surface over which it is travelling such that vehicle stability is not compromised. This is the case even in the event of a malfunction with of the torque request controller which results in the issuance of an erroneous torque request signal which would destabilize the vehicle if acted upon by the torque actuation controller.

The entire contents of the applicant's earlier application UK Patent Application No. 1020440.2 filed 2 Dec. 2010 and any related applications are expressly incorporated herein by reference.

The present invention has been described with reference to a powertrain control module 1 configured to generate engine and motor torque request signals. The present invention is not limited in this respect and could be implemented in control systems in which other system modules (such as a Vehicle Supervisory Module) generate the torque request signals.

It will be appreciated that various changes and modifications can be made to the embodiment described herein without departing from the scope of the present invention.

The invention claimed is:

1. A control system for a vehicle, comprising:
    a torque limit calculator, a torque request module, the torque request module comprising a first torque control module, and a second torque control module, separate to the torque request module;
    wherein the torque limit calculator is configured to generate a torque control signal, the torque control signal being based on one or more vehicle operating parameters, wherein the torque limit calculator is configured to output the torque control signal via a first output to the first torque control module, and output the torque control signal via a second output to the second torque control module;
    wherein the torque request module is configured to generate a torque request signal;
    wherein the first torque control module is configured to receive the torque request signal, and is configured to receive the torque control signal from the torque limit calculator via the first output;
    wherein the first torque control module is configured to adjust the torque request signal based on the torque control signal;
    wherein the torque request module is configured to output a first electric drive motor torque demand signal to control a torque applied by an electric motor of the vehicle, wherein the first electric drive motor torque demand signal is based upon the torque request signal, the torque request signal having been adjusted by the first torque control module; and
    wherein the second torque control module is configured to:
        receive the torque control signal from the torque limit calculator via the second output and the first electric drive motor torque demand signal from the torque request module;
        perform a validation to determine whether the first electric drive motor torque demand signal is valid based on the torque control signal; and
        output a second electric drive motor torque demand signal to control the torque applied by the electric drive motor, wherein the second electric drive motor torque demand signal is identical to the first electric drive motor torque demand signal if the first electric drive motor torque demand signal is determined to be valid via the validation.

2. The control system of claim 1, wherein the torque limit calculator is provided in a vehicle module.

3. The control system of claim 1, wherein the first and second torque control modules are configured to limit the rate of change in applied torque by a powertrain of the vehicle and/or limit the applied torque by the powertrain of the vehicle.

4. The control system of claim 3, wherein the first and second torque control modules are operable to limit the rate of change of the applied torque and/or limit the applied torque based on said torque control signal.

5. The control system of claim 1, wherein the torque limit calculator is provided in an anti-lock brake system module.

6. The control system of claim 1, wherein the torque request module is configured to generate the torque request signal based on a driver torque demand signal and/or a cruise control torque demand signal.

7. The control system of claim 1, wherein the first torque control module is configured to control the electric drive motor and an internal combustion engine.

8. The control system of claim 7, wherein the second torque control module is an inverter configured to control said electric drive motor.

9. The control system of claim 1, wherein the torque limit calculator is provided in a further module, wherein the second torque control module has a higher integrity rating than the torque request module, and wherein the further module has an integrity rating equal to or higher than that of the second torque control module.

10. A motor vehicle having the control system of claim 1.

11. A method of operating a powertrain system comprising a torque limit calculator, a torque request module, the torque request module comprising a first controller, and a second controller, separate to the torque request module, the method comprising:
   generating a torque control signal based on one or more vehicle operating parameters;
   outputting the torque control signal from the torque limit calculator to the first controller via a first output and from the torque limit calculator to the second controller via a second output;
   generating a torque request signal and providing the torque request signal to the first controller;
   adjusting the first torque request signal based on the torque control signal received at the first controller via the first output;
   outputting, from the torque request module to the second controller, a first electric drive motor torque demand signal to control a torque applied by an electric drive motor, wherein the first electric drive motor torque demand signal is based on the torque request signal, the torque request signal having been adjusted;
   performing a validation, at the second controller, to determine whether the first electric drive motor torque demand signal is valid based on the torque control signal received via the second output; and
   outputting a second electric drive motor torque demand signal, from the second controller, to control the torque applied by the electric drive motor, wherein the second electric drive motor torque demand signal is identical to the first electric drive motor torque demand signal if the first electric drive motor torque demand signal is determined to be valid via the validation.

12. The method of claim 11, wherein the torque control signal defines a limit to the rate of change in applied torque by a powertrain and/or a limit to the applied torque by the powertrain.

13. The method of claim 11, wherein the torque request signal after being adjusted limits a magnitude of a torque applied by a powertrain to be less than a magnitude of the torque requested by the torque request signal before it was adjusted.

14. A control system for a vehicle, the control system comprising:
   a torque limit calculator module, a torque request module, the torque request module comprising a first torque control module, and a second torque control module, separate to the torque request module;
   wherein the torque limit calculator module is configured to generate a torque control signal based on one or more vehicle operating parameters, wherein the torque limit calculator is configured to output the torque control signal via a first output to the first torque control module, and output the torque control signal via a second output to the second torque control module;
   wherein the torque request module is configured to generate a torque request signal;
   wherein the first torque control module is configured to receive the torque request signal, and is configured to receive the torque control signal from the torque limit calculator module via the first output, wherein the first torque control module is configured to adjust the torque request signal based on the torque control signal;
   wherein the torque request module is configured to output an engine torque demand signal to control torque applied by an internal combustion engine and to output a first electric drive motor torque demand signal to control the torque applied by the electric drive motor, wherein the engine torque demand signal and the first electric drive motor torque demand signal are based on the torque request signal, the torque request signal having been adjusted by the first torque control module; and
   wherein the second torque control module is configured to:
      receive the torque control signal from the torque limit calculator module via the second output and the first electric drive motor torque demand signal from the torque request module;
      perform a validation to determine whether the first electric drive motor torque demand signal is valid based on the torque control signal; and
      output a second electric drive motor torque demand signal to control the torque applied by the electric drive motor, wherein the second electric drive motor torque demand signal is identical to the first electric drive motor torque demand signal if the first electric drive motor torque demand signal is determined to be valid via the validation.

15. The control system of claim 14, wherein the first and second torque control modules are configured to limit the rate of change in torque applied by a powertrain and/or limit the torque applied by the powertrain.

16. The control system of claim 15, wherein the first and second torque control modules are operable to limit the rate of change of the torque applied by the powertrain and/or limit the torque applied by the powertrain based on said torque control signal.

17. The control system of claim 14, wherein the torque limit calculator module is provided in an anti-lock brake system module of the vehicle.

* * * * *